US012677023B2

(12) United States Patent
Soh et al.

(10) Patent No.: US 12,677,023 B2
(45) Date of Patent: Jul. 7, 2026

(54) AUTOMATIC PARENTAL CONTROL USING A REMOTE CONTROL OR MOBILE APP

(71) Applicant: Roku, Inc., San Jose, CA (US)

(72) Inventors: Andrew Soh, Austin, TX (US); Jeffrey John Peters, Scotts Valley, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/862,273

(22) Filed: Jul. 11, 2022

(65) Prior Publication Data

US 2024/0015354 A1     Jan. 11, 2024

(51) Int. Cl.
*H04N 21/422* (2011.01)
*H04N 21/4415* (2011.01)

(52) U.S. Cl.
CPC ... *H04N 21/42222* (2013.01); *H04N 21/4415* (2013.01)

(58) Field of Classification Search
None
See application file for complete search history.

(56) References Cited

U.S. PATENT DOCUMENTS

| | | | |
|---|---|---|---|
| 2008/0141293 A1* | 6/2008 | Blanchard .......... | H04N 21/4753 348/E5.002 |
| 2017/0169207 A1* | 6/2017 | Asnis ...................... | G06F 3/017 |
| 2019/0246170 A1* | 8/2019 | Sreekanth .......... | H04N 21/4753 |
| 2020/0145602 A1* | 5/2020 | Lee ........................ | G06F 3/0481 |
| 2022/0116674 A1* | 4/2022 | Vishwanath ....... | H04N 21/4331 |
| 2023/0336819 A1* | 10/2023 | Woodruff ........... | H04N 21/4415 |

* cited by examiner

*Primary Examiner* — Samira Monshi
(74) *Attorney, Agent, or Firm* — Sterne, Kessler, Goldstein & Fox P.L.L.C.

(57) ABSTRACT

Embodiments described herein include a method that operates by receiving, at a media device, one or more signals from a remote control. The media device identifies a user currently using the remote control based on the signals. Then, the media device selects content to make available based on the identified user. In some embodiments, the media device identifies the user by using the signals to identify the remote control. Then, the media device determines that a user associated with the identified remote control is the user currently using the remote control.

20 Claims, 5 Drawing Sheets

Remote Control 110

310

310

310

320

400

Media device receives one or more signals from a remote control

410

Media device identifies the user currently using the remote control based on the signal(s)

420

Media device selects content to make available to the user based on the identity of the user

430

AUTOMATIC PARENTAL CONTROL USING A REMOTE CONTROL OR MOBILE APP

TECHNICAL FIELD

This disclosure is generally directed to automatic selection of content that is made available to a user, and more particularly to parental control of content that is made available to children for viewing.

BACKGROUND

Content, such as a movie or TV show, is typically displayed on a television or other display device (such as a mobile phone) for viewing by users.

Content consumption devices such as televisions and mobile phones provide users with a wide variety of content for selection and viewing. For parents, it is desirable to limit the content available to their children to age-appropriate content. But, typically, content consumption devices either do not have parental control functionality, or have a parental control menu system that is difficult to find and/or navigate. And, with technology available in so many forms in today's world, the controls put into place by parents using existing parental control functionality can often be easily bypassed by tech-savvy children.

SUMMARY

Provided herein are system, apparatus, article of manufacture, method and/or computer program product embodiments, and/or combinations and sub-combinations thereof, for selecting content to be made available to users based on respective remote controls used by the users.

An example embodiment of the present disclosure includes a method that operates by receiving, at a media device, one or more signals from a remote control. The media device identifies a user currently using the remote control based on the signals. Then, the media device selects content to make available based on the identified user.

In some embodiments, the media device identifies the user by using the signals to identify the remote control. Then, the media device determines that a user associated with the identified remote control is the user currently using the remote control.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, article of manufacture, method and/or computer program product embodiments, and/or combinations and sub-combinations thereof, for automatically selecting content to be made available to users based on respective remote controls used by the users.

Figure 1:
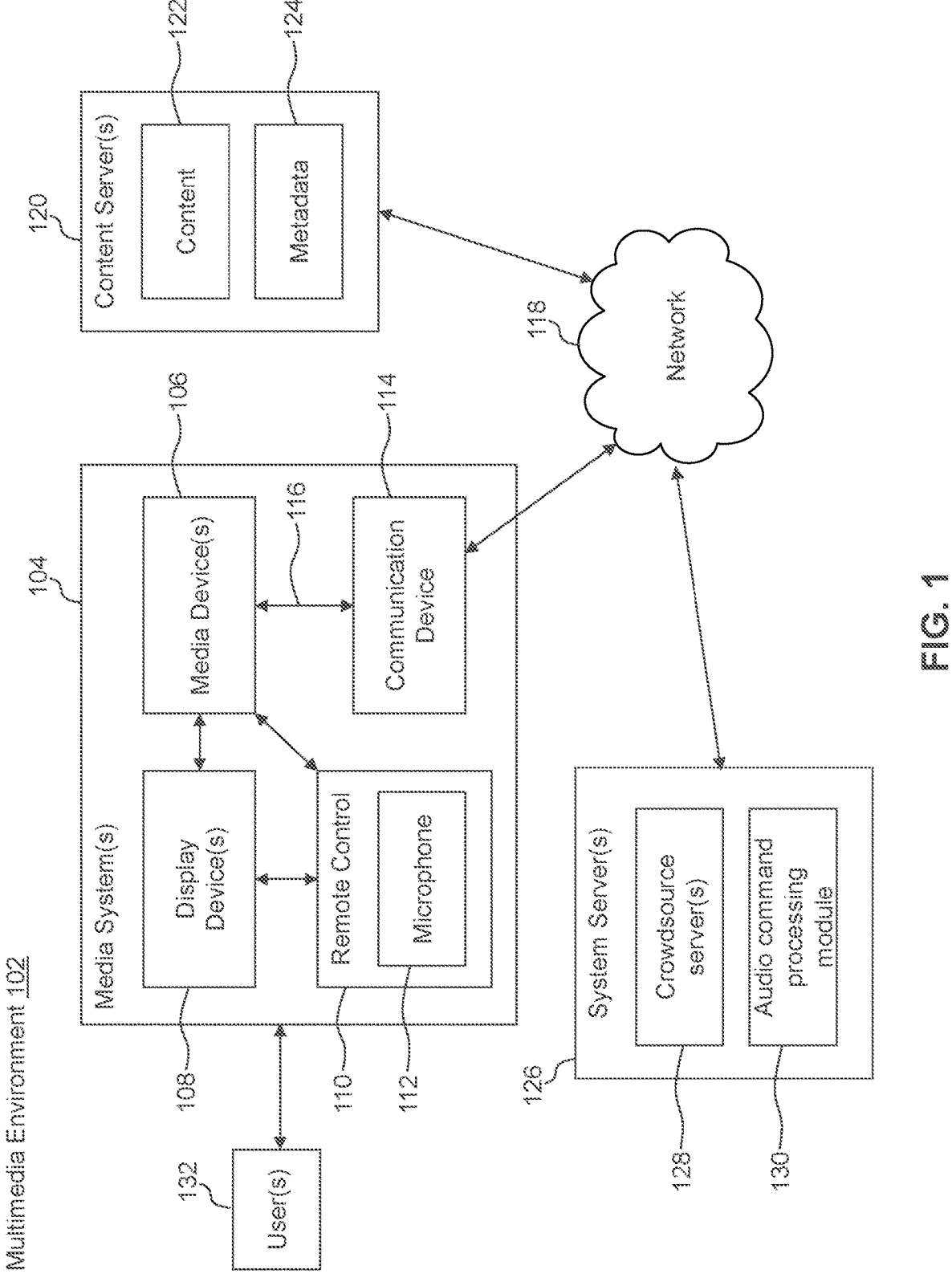
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content. The users 132 can be the members of a family and their guests, including adults, teenagers and young children, and/or can be any other person(s) who may wish to use the media system 104 to consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, interne of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as Wi-Fi) and/or wired connections.

In various embodiments, the network 118 can include, without limitation, wired and/or wireless intranet, extranet, Internet, cellular, Bluetooth, infrared (IR), and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control 110, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using Wi-Fi, cellular, Bluetooth, infrared (IR), etc., or any combination thereof. The remote control 110 may include a microphone 112, which is further described below.

In some embodiments, the media system 104 may include a plurality of remote controls 110. For example, each member of a family (that is, each of the users 132) may have a remote control 110. Or, a first remote control 110 may be associated with adults, a second remote control 110 may be associated with children, a third remote control 110 may be associated with guests, etc.

In some embodiments, the media device 106 automatically selects content to be made available to users 132 based the respective remote controls 110 used by the users 132. For example, if the media device 106 determines that the remote control 110 it is currently communicating with is associated with a child, then the media device 106 may only make available content that is age-appropriate for that child. This functionality, and the remote control(s) 110, are further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional embodiments of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' 132 viewing experience at particular portions of the movie (for example, when the soundtrack of the movie is difficult to hear), and turning closed captioning off may enhance users' 132 viewing experience at other portions of the movie (for example, when displaying closed captioning obstructs critical visual embodiments of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user's 132 verbal command. The audio command processing module 130 may then forward the verbal command back to the media device 106 for processing.

Figure 2:
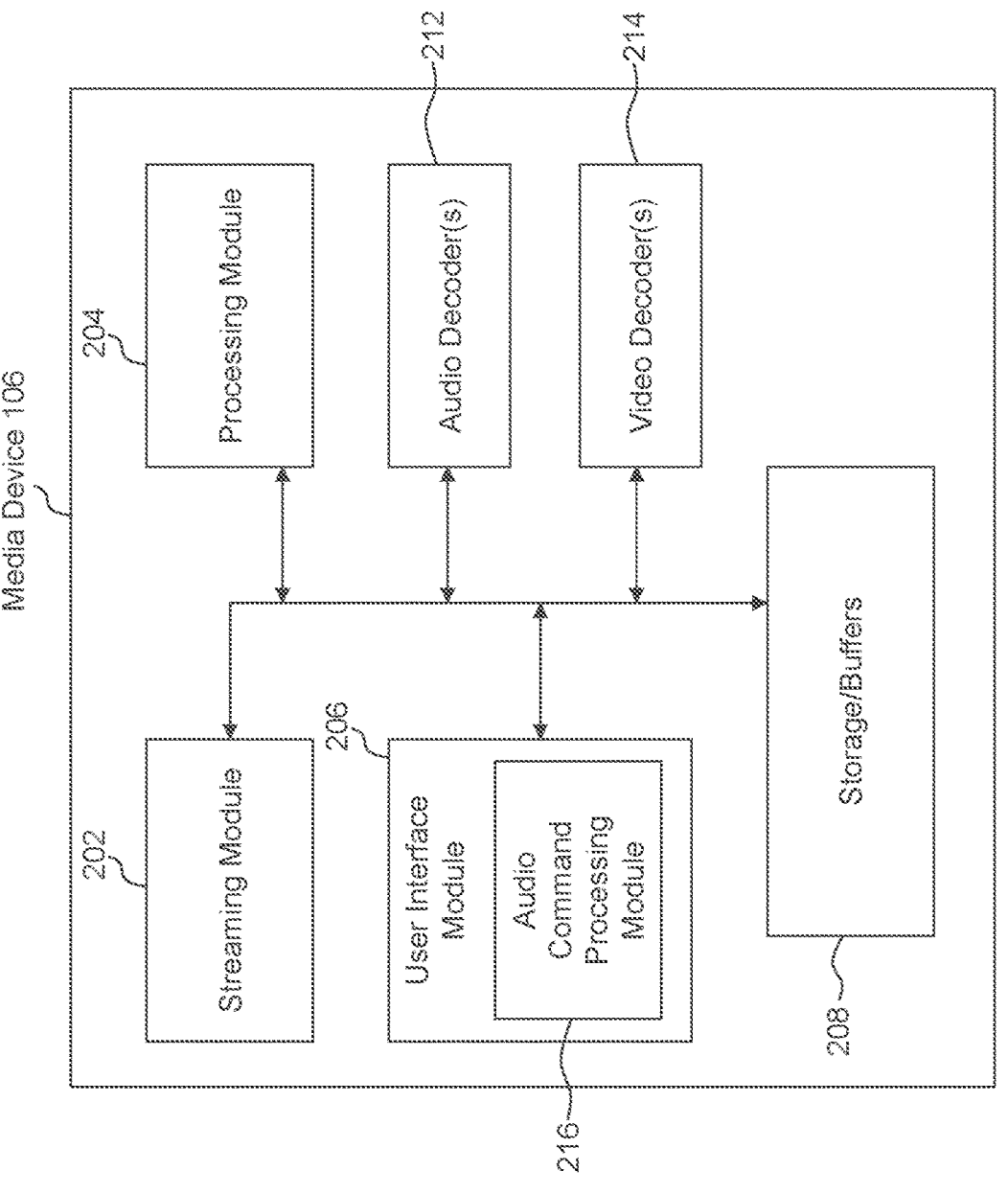
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132. This interaction will be further described below with reference to FIGS. 3 and 4.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Example Remote Control

Figure 3:
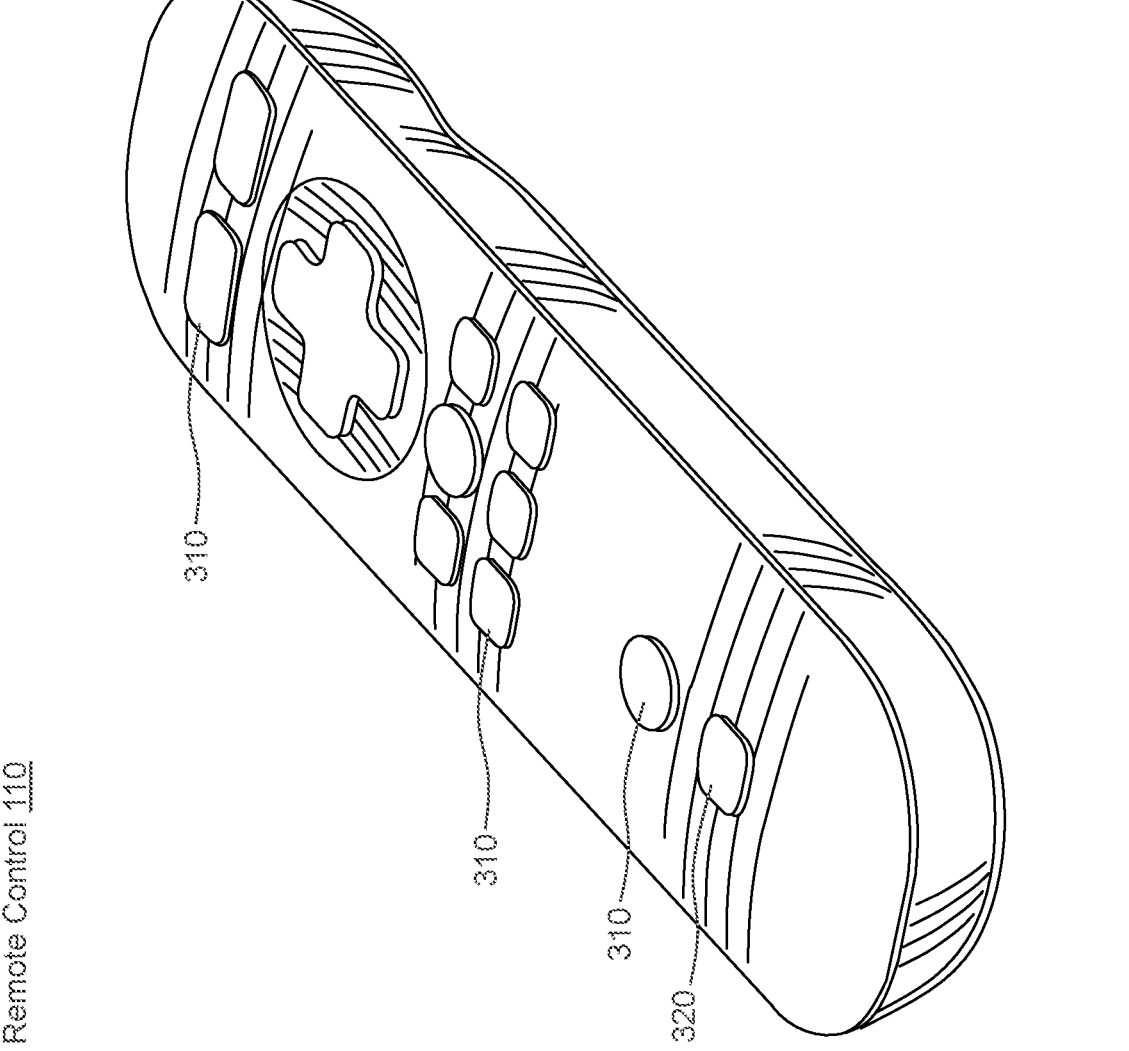
FIG. 3 illustrates an example remote control for a streaming media device, according to some embodiments.

FIG. 3 illustrates an example remote control 110 having a plurality of buttons 310. As will be appreciated by persons skilled in the relevant arts, buttons 310 may be used to navigate through menus displayed on the display device 108, change the channel and volume, go to the home screen, change settings of the display device 108 and/or the media device 106, etc. In some embodiments, the remote control 110 may also have a fingerprint scanner 320 that may be implemented using any well-known technology.

The remote control 110 may also be an app on a mobile phone, tablet, computer, appliance, interne of things (IOT) device, etc. In this case, the buttons 310 and fingerprint scanner 320 may be displayed by the app in a display screen of such mobile phone, tablet, etc. Accordingly, when remote controls 110 are discussed herein, it should be understood that the remote controls 110 may be any combination of dedicated remote controls and apps.

As noted above, the media system 104 may include a plurality of remote controls 110, and the remote controls 110 may be respectively assigned to or associated with the different users 132 who use the media device 106. As also noted above, in some embodiments, the media device 106 automatically selects content 122 to be made available to users 132 based on the respective remote controls 110 that are used by the users 132.

In particular, in some embodiments, to select content 122 to be made available via the media device 106, the media device 106 determines which user 132 is currently using the remote control 110 to communicate with the media device 106. The media device 106 may perform this function by identifying the remote control 110 that it is currently communicating with. Then, the media device 106 determines that the user 132 who is currently using the media device 106 is the user 132 assigned to that identified remote control 110. The media device 106 then selects and makes available customized content 122 for that user 132.

The remote controls 110 may be a variety of colors and patterns such as black, green, blue, red, polka dotted, striped, etc. The remote controls 110 may also be different shapes and sizes. For example, a given remote control 110 may be child friendly, such as in the shape of an animal, a super hero, a toy car, a princess doll, etc. Additionally, some remote controls 110 may have less buttons 310 or bigger buttons 310 than depicted in FIG. 3, to ease operation for children. Also, the buttons 310 for a child may also be designated specifically for children content channels. These children content channels may be age appropriate applications for children of certain age groups. In this manner, users 132 may pick remote controls 110 that they find appealing.

In embodiments, despite having different shapes, colors, sizes, etc., the remote controls 110 have the same or substantially the same functionality. That is, the remote controls 110 enable users 132 to interact with the media device 106 and/or display device 108 as discussed herein.

The remote controls 110 may communicate with the media device 106 using a variety of different technologies, such as Wi-Fi, cellular, Bluetooth, infrared (IR), etc., or any combination thereof. As will be appreciated by persons skilled in the relevant arts, regardless of the technology used to communicate between the remote controls 110 and the media device 106, the media device 106 is able to uniquely identify each of the remote controls 110. This may be achieved, for example, via header data, handshaking, protocols and/or other signals in the communications between the remote controls 110 and the media device 106. Accordingly, the media device 106 is able to uniquely identify the particular remote control 110 it is communicating with at any time.

As noted above, each remote control 110 is associated with or assigned to a user 132 or group of users 132 (such as children, adults, guests, etc.). Such association may be established when each remote control 110 initially communicates (or pairs) with the media system 104. For example, when the media device 104 is communicating with a remote control 110 for the first time, the media device 104 may ask the user 132 to input a name or group of the user 132 who is to be associated with that remote control 110 (this may be achieved via prompts displayed on the display device 108). The user 132 who is using the remote control 110 at that moment may not be the user 132 who is associated with the remote control 110. This may occur, for example, when a parent registers a remote control 110 for a child.

These associations may be established or changed at other times. For example, the media device 106 may provide a menu or user interface (UI) that is displayed on the display device 108. By navigating that UI, users 132 may be able to input or change the user or group associated with each of the remote controls 110.

Also, for a given remote control 110, the UI may generate a list of questions to establish what content 122 should be display when that remote control 110 is being used to control the media device 106. For example, these questions may be directed to likes and dislikes of the user 132 associated with that remote control 110.

A parent may answer these questions for a child, to establish the content 122 that will be made available when the remote control 110 associated with that child is communicating with the media device 106. An example question may be the child's age. Based on the age, the media device 106 may make available content 122 appropriate for that age when the remote control 110 associated with that child is communicating with the media device 106.

Additionally, the UI of the media device 106 may change based on the remote control 110 that is currently being used. For example, if a child is associated with the remote control 110, then the UI may be switched to a simpler UI (i.e., an age appropriate UI) that is easier for a child to use.

Further, based on the user 132 associated with the remote control 110 currently being used, the media device 106 may: (1) limit the days and/or times that the user 132 may use the media device 106; (2) limit the channels and content sources available to the user 132; (3) limit purchases that the user 132 can make via the media device 106; and/or (4) restrict access to certain parts of the UI (so as to prevent children from changing the controls and limits described above, for example).

Determining the User Who Is Using the Remote Control

As just described, the media device 106 identifies the remote control 110 currently communicating with the media device 106, and then determines that the user 132 currently using the media device 106 is the user 132 associated with the identified remote control 110. Then, the media device 106 makes available content 122 based on the determined user 132.

This determination, however, is an assumption, because the user 132 assigned to the remote control 110 may not actually be the user 132 who is currently using the remote control 110. And, if a user 132 uses a remote control 110 not assigned to him or her, then the proper content 122 will not be made available to that user 132.

Accordingly, this disclosure includes additional embodiments for identifying the user 132 who is using the remote control 110. Any of the embodiments described herein may be used individually or in any combination.

For example, in some embodiments, the remote control 110 may include a fingerprint scanner 320. The fingerprint scanner 320 scans the user's 132 fingerprint in a well-known manner. Then, the media device 106 and/or the remote control 110 may compare that fingerprint to a database of fingerprints in a well-known manner, to thereby identify the user 132 currently using the media device 106.

In some embodiments, the remote control 110 may include an accelerometer or other motion sensing module (not shown in FIG. 3). The accelerometer may track the motion of the user 132 while using the remote control 110, such as shaking, tilting, swinging, rotating, etc. The remote control 110 and/or media device 106 may compare those movements to ones in a database to thereby identify the user 132 currently using the media device 106. The foregoing may be achieved in a similar manner by tracking the way the user 132 presses the buttons 310 of the remote control 110.

In some embodiments, the remote control 110 and/or media device 106 identifies the mobile phone located closest to the remote control 110 or the media device 106 using well known Wi-Fi or cellular techniques and technology. Then, the remote control 110 and/or media device 106 accesses a database of mobile phones (which may be inputted using the UI discussed above) to identify the user 132 currently using the media device 106. This embodiment assumes that the user 132 whose mobile phone is closest to the remote control 110 or media device 106 is the user 132 currently using the remote control 110.

Additionally, the remote control 110 may include a well-known sensor (not shown) for voice identification. The user 132 may speak into the microphone 112 of the remote control 110, and the remote control 110 and/or media device 106 may then recognize the user 132 via his or her voice in a well-known manner.

These and additional techniques and approaches for identifying the user 132 using the remote control 110 are within the scope and spirit of this disclosure, as will be apparent to persons skilled in the relevant arts based on the herein teachings.

Automatically Selecting Content Using the Remote Control

Figure 4:
FIG. 4 is an example method for selecting content that is made available for viewing by users, according to some as embodiments.
Figure 4:
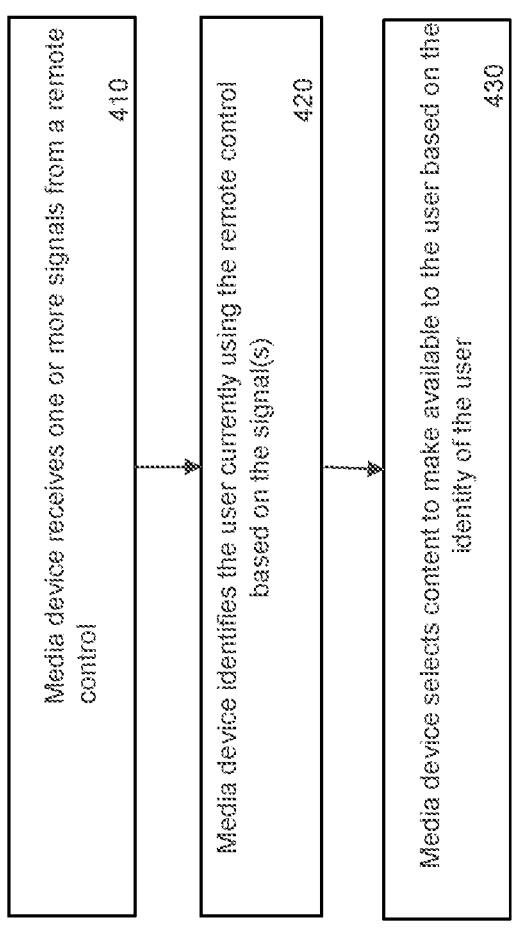

FIG. 4 is an example method 400 for automatically selecting content to be made available to users 132 based on the respective remote controls 110 used by the users 132. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1 and 3. However, method 400 is not limited to that example embodiment.

In step 410, the media device 106 receives one or more signals from a remote control 110. The signals may be sent while the remote control 110 and the media device 106 are communicating. From those signal(s), the media device 106 uniquely identifies the remote control 110.

Also or alternatively, the signals may include any of fingerprint, motion, location, voice, etc., information, as described above.

In step 420, the media device 106 identifies the user 132 currently using the media device 106 based on the signals received from the remote control 110. The identification of the current user 132 may be assumed (in the case where the media device 106 assumes the current user 132 is the user 132 associated with the identified remote control 110, for example), or actual (in the case where the media device 106 identifies the current user 132 using fingerprint information, for example).

In step 430, the media device 106 selects content 122 to make available for the current user 132. In other words, the media device 106 customizes the available content 122 based on the identity of the current user 132.

Example Computer System

Figure 5:
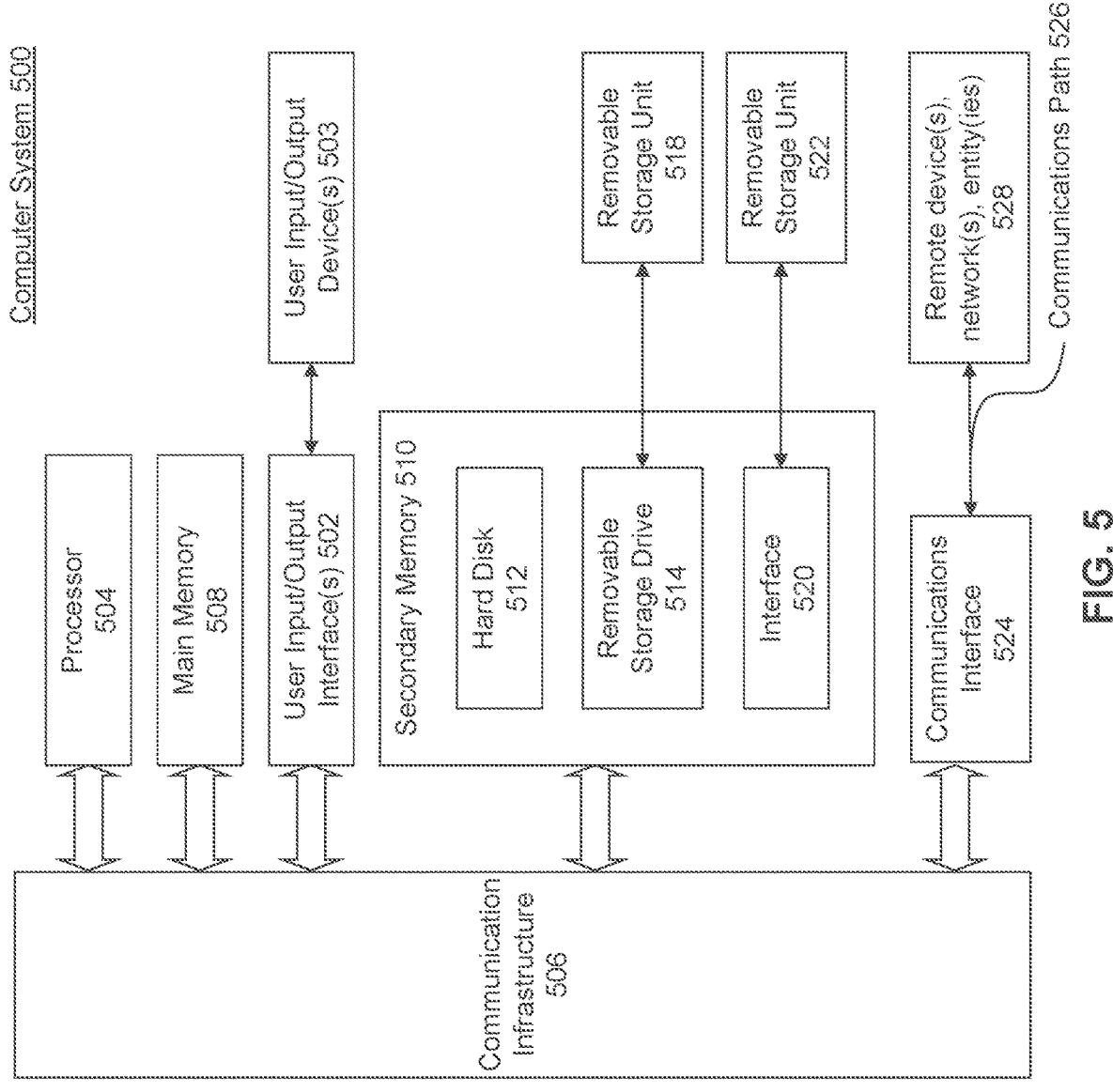
FIG. 5 illustrates an example computer system useful for implementing various embodiments.

Various embodiments may be implemented, for example, using one or more well-known computer systems, such as computer system 500 shown in FIG. 5. For example, the media device 106 may be implemented using combinations or sub-combinations of computer system 500. Also or alternatively, one or more computer systems 500 may be used, for example, to implement any of the embodiments discussed herein, as well as combinations and sub-combinations thereof Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/ any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for controlling content, comprising:

receiving, at a media device, one or more signals from a first remote control comprising a microphone, wherein the one or more signals comprise a user speech signal collected via the microphone and a motion of the first remote control or a location of the first remote control, wherein the media device is part of a media system that includes at least the first remote control and a second remote control, wherein the first remote control is associated with an adult user group and the second remote control is associated with a child user group, wherein the respective associations are established when each of the first and second remote controls initially pair with the media device;

identifying, at the media device, a user currently using the first remote control based at least on the one or more signals, wherein the identifying the user currently using the first remote control based at least on the one or more signals comprises:

comparing a motion stored in a database and associated with the user currently using the first remote control to the motion of the first remote control represented by the one or more signals and performing voice identification of the user based on the user speech signal, or identifying a mobile device that is located closest to the location of the first remote control represented by the one or more signals and accessing a database that associates users with corresponding mobile devices to identify the user currently using the first remote control based on an association between the user currently using the first remote control and the mobile device;

determining that the user currently using the first remote control is not in the adult user group associated with the first remote control;

limiting, at the media device, content to make available based on the user currently using the first remote control, wherein predefined content is associated with the user currently using the first remote control, based on an age of the identified user currently using the first remote control, the age being parentally established responsive to questions presented during a setup of the media device; and selecting, at the media device, content based on the limited content.

2. The computer implemented method of claim 1, wherein the second remote control has larger and fewer buttons than the first remote control.

3. The computer implemented method of claim 1, wherein the first remote control comprises a fingerprint scanner, and wherein the identifying the user currently using the first remote control further comprises:

identifying, at the media device, the user currently using the first remote control based also on fingerprint information of the user currently using the first remote control collected by the fingerprint scanner.

4. The computer implemented method of claim 1, wherein the first remote control comprises an accelerometer, and wherein the identifying the user currently using the first remote control comprises:

determining the motion of the first remote control based on movement information collected by the accelerometer while the user currently using the first remote control is using the first remote control to communicate with the media device.

5. The computer implemented method of claim 1, wherein the user currently using the first remote control is a child, and the selected content is age appropriate for the child.

6. The computer implemented method of claim 1, further comprising:

restricting access to functions of the media device based on the determining that the user currently using the first remote control is not in the adult user group associated with the first remote control.

7. A media device configured to communicate with a plurality of remote controls comprising a first remote control and a second remote control each associated with a user group and each comprising a microphone, the media device comprising:

at least one processor configured to perform operations comprising:

receiving one or more signals from the first remote control, wherein the one or more signals comprise a user speech signal collected via the microphone of the first remote control and a motion of the first remote control or a location of the first remote control, wherein the first remote control is associated with an adult user group and the second remote control is associated with a child user group, wherein the respective associations are established when each of the first and second remote controls initially pair with the media device;

identifying a user currently using the first remote control based at least on the one or more signals, wherein the identifying the user currently using the first remote control based at least on the one or more signals comprises:

comparing a motion stored in a database and associated with the user currently using the first remote control to the motion of the first remote control represented by the one or more signals and performing voice identification of the user based on the user speech signal, or identifying a mobile device that is located closest to the location of the first remote control represented by the one or more signals and accessing a database that associates users with corresponding mobile devices to identify the user currently using the first remote control based on an association between the user currently using the first remote control and the mobile device;

determining that the user currently using the first remote control is not in the adult user group associated with the first remote control;

limiting content to make available based on the user currently using the first remote control, wherein predefined content is associated with the user currently using the first remote control, based on an age of the identified user currently using the first remote control, the age being parentally established responsive to questions presented during a setup of the media device; and selecting content based on the limited content.

8. The media device of claim 7, wherein the second remote control has larger and fewer buttons than the first remote control.

9. The media device of claim 7, wherein the first remote control comprises a fingerprint scanner, and wherein the identifying the user currently using the first remote control further comprises:

identifying the user currently using the first remote control based also on fingerprint information of the user currently using the first remote control collected by the fingerprint scanner.

10. The media device of claim 7, wherein the first remote control comprises an accelerometer, and wherein the identifying the user currently using the first remote control comprises:

determining the motion of the first remote control based on movement information collected by the accelerometer while the user currently using the first remote control is using the first remote control to communicate with the media device.

11. The media device of claim 7, wherein the user currently using the first remote control is a child, and the selected content is age appropriate for the child.

12. The media device of claim 7, the operations further comprising:

restricting access to functions of the media device based on the determining that the user currently using the first remote control is not in the adult user group associated with the first remote control.

13. The media device of claim 8, wherein the second remote control is of a different shape and size than the first remote control and has buttons designated specifically for children content channels.

14. The media device of claim 7, the operations further comprising:

based on the determining that the user currently using the first remote control is not in the adult user group associated with the first remote control, changing a user interface of the media device to a simpler, age-appropriate child user interface.

15. A non-transitory computer-readable medium having instructions stored thereon that, when executed by at least one computing device, cause the at least one computing device to perform operations comprising:

receiving, by a media device, one or more signals from a first remote control comprising a microphone, wherein the one or more signals comprise a user speech signal collected via the microphone and a motion of the first remote control or a location of the first remote control, wherein the media device is part of a media system that includes at least the first remote control and a second remote control, wherein the first remote control is associated with an adult user group and the second remote control is associated with a child user group, wherein the respective associations are established when each of the first and second remote controls initially pair with the media device;

identifying a user currently using the first remote control based at least on the one or more signals, wherein the identifying the user currently using the first remote control based at least on the one or more signals comprises:

comparing a motion stored in a database and associated with the user currently using the first remote control to the motion of the first remote control represented by the one or more signals and performing voice identification of the user based on the user speech signal, or identifying a mobile device that is located closest to the location of the first remote control represented by the one or more signals and accessing a database that associates users with corresponding mobile devices to identify the user currently using the first remote control based on an association between the user currently using the first remote control and the mobile device;

determining that the user currently using the first remote control is not in the adult user group associated with the first remote control;

limiting content to make available based on the user currently using the first remote control, wherein predefined content is associated with the user currently using the first remote control, based on an age of the identified user currently using the first remote control, the age being parentally established responsive to questions presented during a setup of the media device; and selecting content based on the limited content.

16. The non-transitory computer-readable medium of claim 15, wherein the second remote control has larger and fewer buttons than the first remote control.

17. The non-transitory computer-readable medium of claim 15, wherein the first remote control comprises a fingerprint scanner, and wherein the identifying the user currently using the first remote control further comprises:

identifying the user currently using the first remote control based also on fingerprint information of the user currently using the first remote control collected by the fingerprint scanner.

18. The non-transitory computer-readable medium of claim 15, wherein the first remote control comprises an accelerometer, and wherein the identifying the user currently using the first remote control comprises:

determining the motion of the first remote control based on movement information collected by the accelerometer while the user currently using the first remote control is using the first remote control to communicate with the media device.

19. The non-transitory computer-readable medium of claim 15, wherein the user currently using the first remote control is a child, and the selected content is age appropriate for the child.

20. The non-transitory computer-readable medium of claim 15, the operations further comprising:

restricting access to functions of the media device based on the determining that the user currently using the first remote control is not in the adult user group associated with the first remote control.

\* \* \* \* \*